US006622364B2

(12) United States Patent
Hamilton et al.

(10) Patent No.: US 6,622,364 B2
(45) Date of Patent: Sep. 23, 2003

(54) METHOD FOR MAKING A BED SIDERAIL APPARATUS

(75) Inventors: Michael W. Hamilton, West Harrison, IN (US); Jeffrey A. Moster, Cincinnati, OH (US); Robert Mark Zerhusen, Cincinnati, OH (US); David M. Hensley, Milan, IN (US); David W. Hornbach, Brookville, IN (US)

(73) Assignee: Hill-Rom Services, Inc., Wilmington, DE (US)

( * ) Notice: Subject to any disclaimer, the term of this patent is extended or adjusted under 35 U.S.C. 154(b) by 0 days.

(21) Appl. No.: 09/873,552

(22) Filed: Jun. 4, 2001

(65) Prior Publication Data

US 2001/0023508 A1 Sep. 27, 2001

Related U.S. Application Data

(62) Division of application No. 09/264,439, filed on Mar. 8, 1999, now Pat. No. 6,240,580.

(51) Int. Cl.[7] .................................................. B23P 17/00

(52) U.S. Cl. ............................ 29/416; 29/417; 29/460; 29/463; 29/527.4; 72/254

(58) Field of Search .......................... 29/412, 415, 416, 29/DIG. 37, 527.2, 527.4, 460, 463, 469, 417; 72/253.1, 254

(56) References Cited

U.S. PATENT DOCUMENTS

| | | | | |
|---|---|---|---|---|
| 3,585,659 A | | 6/1971 | Burst et al. | |
| 4,332,042 A | | 6/1982 | Koncelik | |
| 4,653,129 A | | 3/1987 | Kuck et al. | |
| 4,747,171 A | | 5/1988 | Einsele et al. | |
| 5,175,897 A | | 1/1993 | Marra, Jr. | |
| 5,357,775 A | * | 10/1994 | Nakazawa et al. | 72/254 |
| 5,439,268 A | | 8/1995 | Dozsa-Farkas | |
| 5,577,277 A | | 11/1996 | Sundberg et al. | |
| 5,761,756 A | * | 6/1998 | Nowak et al. | 5/426 |
| 5,781,945 A | | 7/1998 | Scherer et al. | |
| 5,802,636 A | | 9/1998 | Corbin et al. | |
| 6,000,076 A | | 12/1999 | Webster et al. | |

FOREIGN PATENT DOCUMENTS

| | | |
|---|---|---|
| EP | 0037063 | 7/1981 |
| WO | WO9817153 | 4/1998 |

* cited by examiner

*Primary Examiner*—David P. Bryant
(74) *Attorney, Agent, or Firm*—Timothy E. Niednagel; Bose McKinney & Evans LLP

(57) ABSTRACT

A method for assembling a modular siderail for attachment to a bed comprises forming a first end section to include a first connector joint, forming a second end section to include a second connector joint, and coupling the first connector joint and the second connector joint to form a skeletal structure.

35 Claims, 7 Drawing Sheets

METHOD FOR MAKING A BED SIDERAIL APPARATUS

RELATED APPLICATION

This application is a divisional application of U.S. patent application Ser. No. 09/264,439, filed Mar. 8, 1999, now U.S. Pat. No. 6,240,580, the disclosure of which is incorporated herein by reference.

BACKGROUND AND SUMMARY OF THE INVENTION

This invention relates to siderails for beds and more particularly to modular siderail systems for forming skeletal structures of differing length siderails for hospital beds using various combinations of only two major skeletal components.

Health care facilities typically provide patients with beds that have siderails to prevent patients from falling out of their beds during sleep or seizures and to provide a convenient location for controls for bed positioning, nurse call buttons, speakers, television, room lighting, etc. Hospital beds are provided with siderails of differing lengths to meet the patient's needs and the hospital's aesthetic preferences. Therefore, hospital bed suppliers must have access to hospital bed siderails of varying lengths so that they can meet their customers' preferences in filling orders for beds. Hospital beds typically include siderails on each side of the bed. Often components of left and right siderails are not interchangeable requiring bed suppliers to maintain additional components in their inventories.

Hospital bed suppliers would welcome a modular siderail that includes a skeleton which can be assembled in varying lengths using a minimum number of components designed to be freely interchangeable between left siderails and right siderails.

A bed siderail system in accordance with the present invention includes a first skeletal end section having an exterior end and in interior end with a connector thereon, a second skeletal end section substantially identical to the first skeletal end section, and at least one extender having a first end with a connector thereon and a second end with a connector thereon connectable to the connector of the first and second skeletal end sections. The first and second skeletal end sections can be directly connected through the connectors on their internal ends to form a shorter length siderail, the connector of the first end section can be directly connected to one end of an extender and the connector of the second skeletal end section can be connected to the second end of the extender to form a siderail having a longer length. Multiple extender sections can be disposed between the first skeletal end section and the second skeletal end section to form even longer bed rails.

It will be appreciated therefore, that the invention is a siderail frame comprising a pair of end sections each having a cross sectional extruded shape providing an exterior and interior end such that the interior ends of the end sections are joinable to form a siderail frame. Extender sections are also provided which are joinable to the end sections to form extended siderail frames.

Features and advantages of the invention will become apparent to those skilled in the art upon consideration of the following detailed description of an illustrated embodiment exemplifying the best mode of carrying out the invention as presently perceived.

DETAILED DESCRIPTION OF THE DRAWINGS

Figure 12:
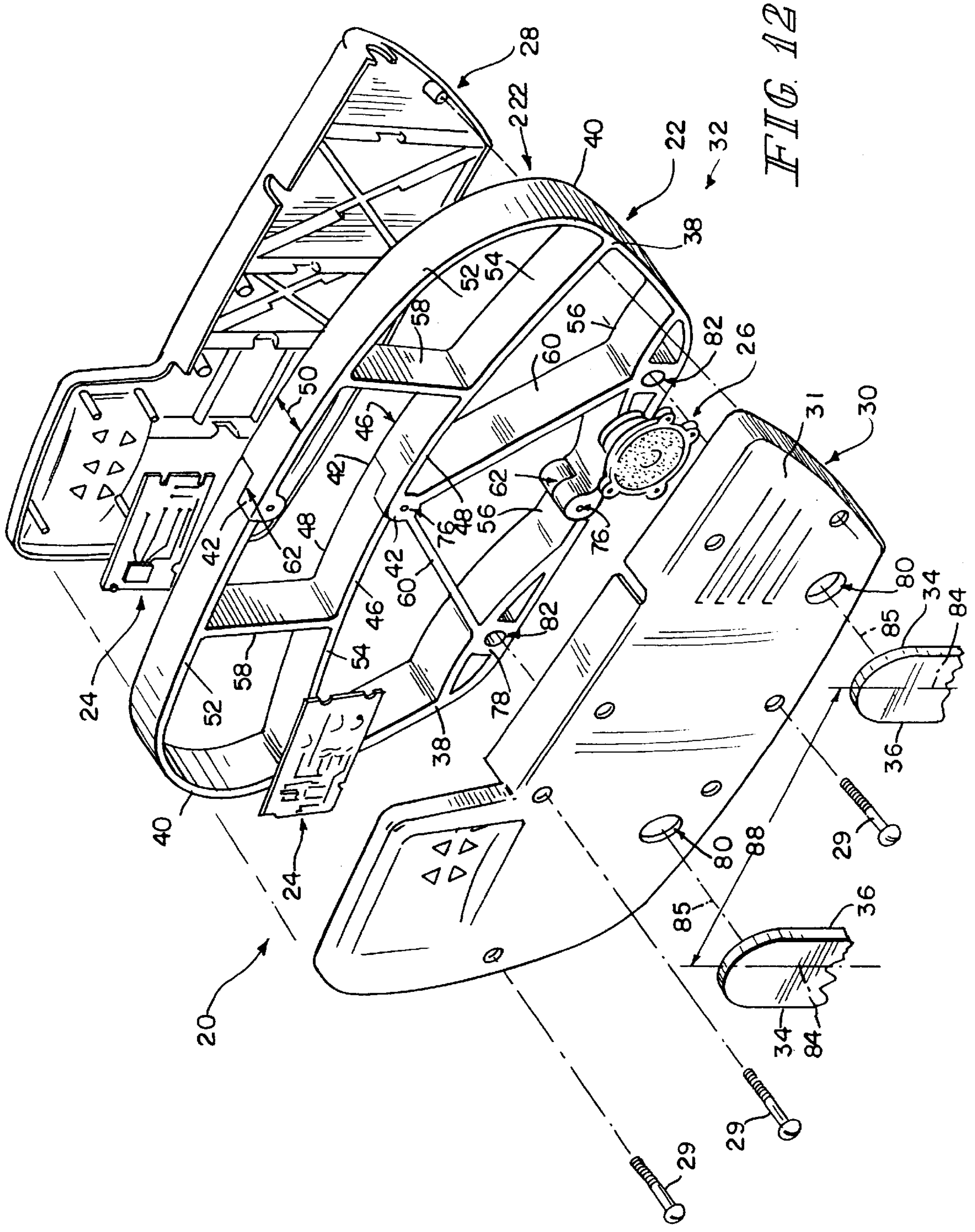
FIG. 12 is an exploded view of a half length siderail having an internal skeleton formed from two end sections around which two shell sections are secured to form a housing in which circuit boards for the controls and speakers may be received.

Referring to FIG. 12, there is illustrated a siderail 20 for attachment to a hospital bed (not shown). Siderail 20 helps to prevent a patient from falling out of the bed and also provides a convenient location for switches, controls, and speakers. Siderail 20 consists of a skeletal structure or skeleton 22, circuitry and switches on circuit boards 24, speaker 26, and a molded shell 32 which partially encloses skeletal structure 22 and encloses the circuit boards 24 and speaker 26 therein. In the illustrated embodiment of siderail 20, a caregiver-facing shell half 28 and a patient-facing shell half 30 are joined with screws 29 to form exterior shell 32 of siderail 20. Siderail 20 is attached by screws, bolts, or other fasteners (not specifically shown but represented by lines 85 in FIG. 12) to first end 34 of arm mechanisms 36 which are connected at second end to the frame of the bed.

As can be seen in FIG. 12, illustrative skeleton 22 of siderail 20 is symmetrically formed so that caregiver-facing shell half 28 and patient-facing shell half 30 can be attached in either direction to skeleton 22. Caregiver-facing shell half 28 and patient-facing shell half 30 at first glance appear to be substantial mirror images of each other. In actuality caregiver-facing shell half 28 and patient-facing shell half 30 differ in that patient facing shell half 30 typically includes attachment holes 80 therethrough to allow attachment of siderail 20 to arm mechanisms 36, a speaker grill 31 behind which the diaphragm of speaker 26 is located in the assembled siderail 20, and either more, or fewer, controls. The illustrated structure can be assembled to form a left siderail 20 (from the perspective of the patient lying supine in the bed to which siderail is attached) as shown in FIG. 12. A right siderail 20R (not shown) may be formed by attaching true mirror images 28R, 30R (not shown) of caregiver-facing shell half 28 and patient-facing shell half 30 respectively in the opposite direction from that shown in FIG. 12. Therefore, left and right siderails can be formed from the skeletal structure 22 reducing the need for differently configured parts to form siderails 20 for beds.

Figure 1:
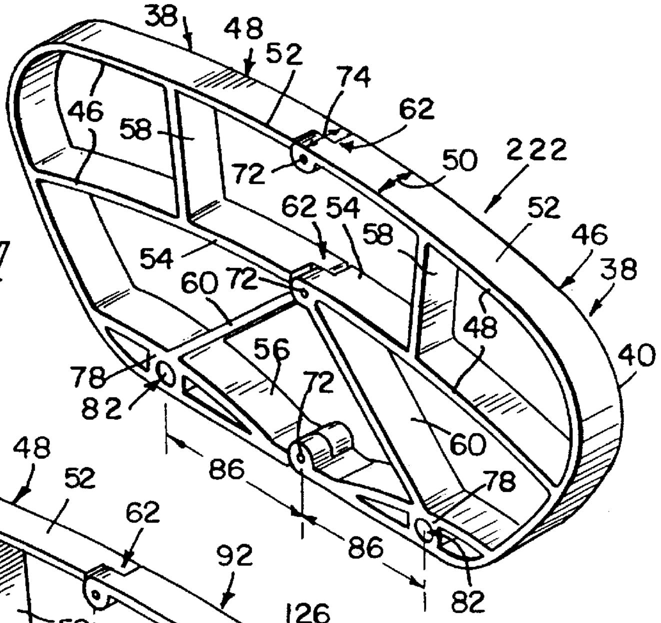
FIG. 1 is a perspective view of a half-length siderail skeleton in accordance with the present invention showing two identical end sections connected together at connectors on their interior ends to form the half-length siderail skeleton.
Figure 2:
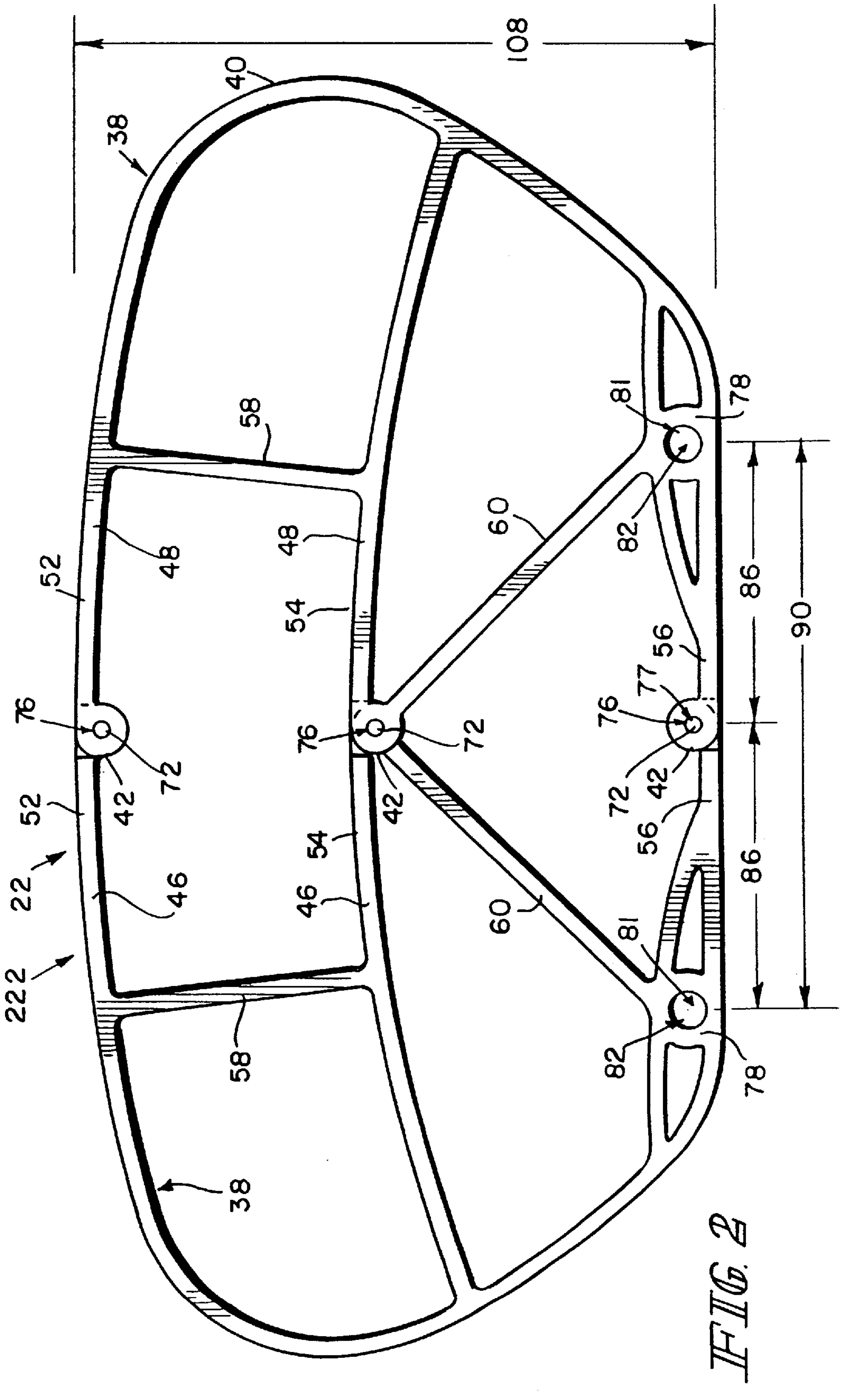
FIG. 2 is a plan view of the half-length siderail skeleton of FIG. 1.

Referring to FIGS. 1, 2, and 12, a half length siderail skeleton 222 includes two identical end sections 38 oriented in opposite directions and joined together. Each end section 38 includes an exterior (or first) end 40 and an interior (or second) end 42 with interior end 42 being formed to allow end section 38 to be joined to another end section 38 (or another skeletal component as will be described later). Because skeletal structure 222 of half length siderail 20 is formed from two identical components, mirror images of a longitudinally divided shell can be attached to skeletal structure 222 in opposite orientations to form a left siderail and a right siderail.

Referring now particularly to FIGS. 1, 2, and 6–9, the presently preferred embodiment of end section 38 is shown. End section 38 is designed and arranged so that two identically configured end sections 38 may be joined to form a skeleton 222 of a half length siderail. End section 38 has an exterior end 40 and an interior end 42 having connectors 44. Illustratively, end section 38 is formed by extrusion of an aluminum alloy in the shape shown in FIG. 6. End section 38 is sliced, cut or otherwise separated from the end-shaped extrudate to have a first side 46 and a substantially parallel second side 48 defining a thickness 50, as shown for example in FIG. 7.

Figure 6:
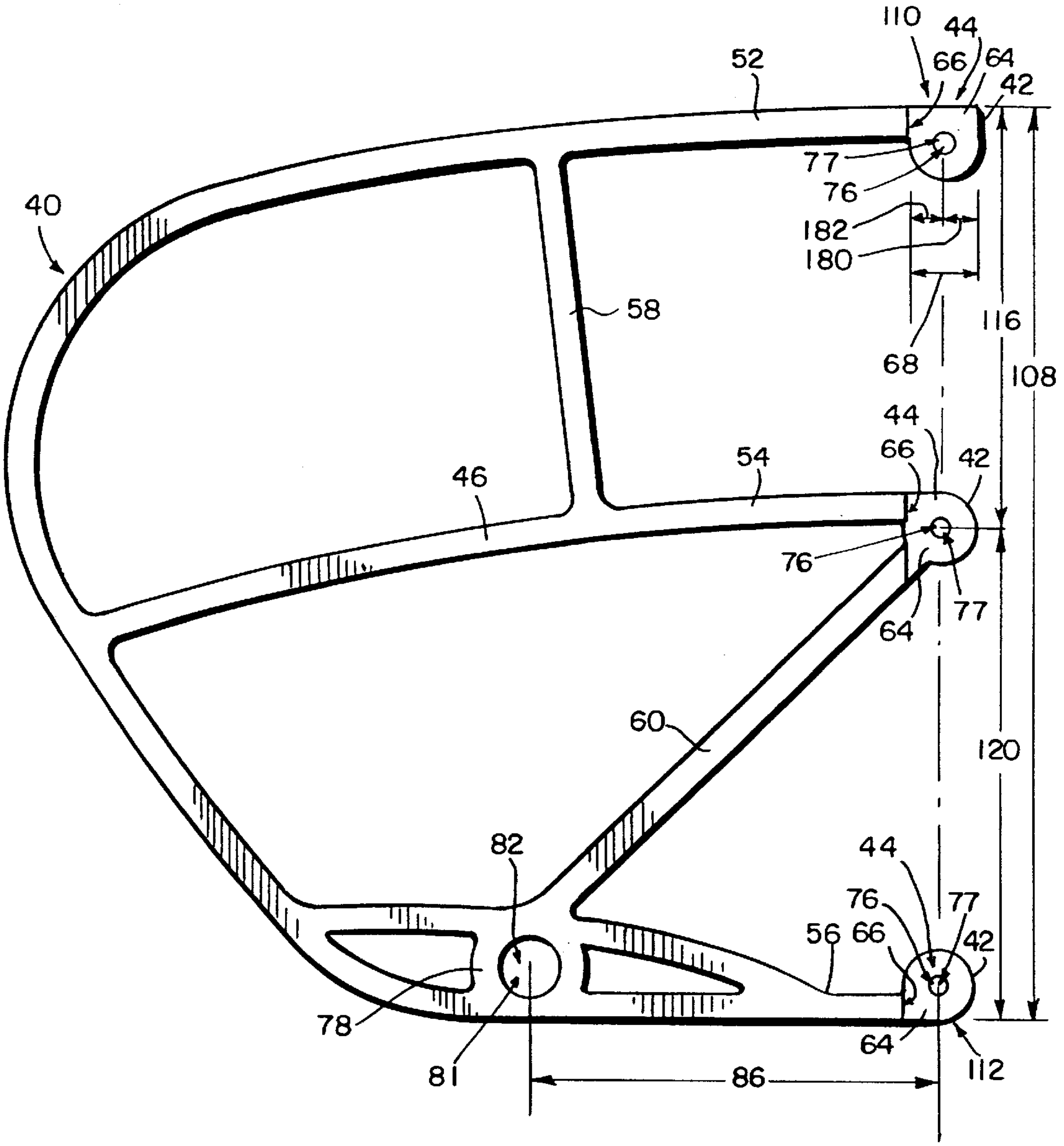
FIG. 6 is a plan view of an end section of a modular siderail skeleton system.
Figure 7:
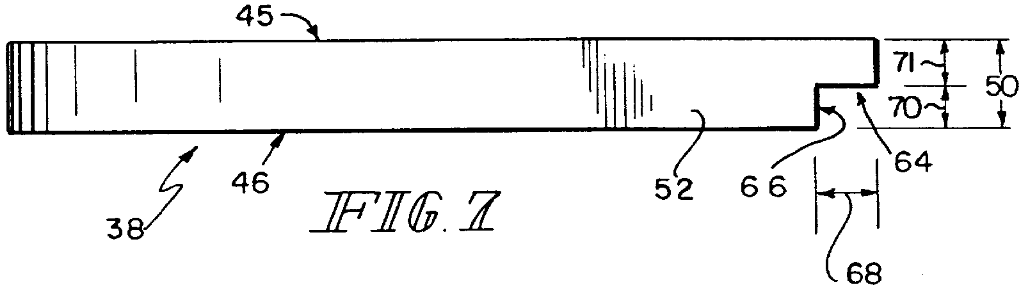
FIG. 7 is a top plan view of the end section of FIG. 6.

End section 38 has an upper member 52, a middle member 54, and a lower member 56 with these members 52, 54, 56 being connected at exterior end 40 and being spaced apart at interior end 42 as shown in FIG. 6. Upper support 58 extends substantially vertically between upper member 52 and middle member 54 and lower support 60 extends at an angle from near interior end 42 of middle member 54 to near exterior end 40 of lower member 56 to increase the structural rigidity of end section 38.

Either during or after the separation of end section 38 from the end-shaped extrudate, shoulders 66 and cheeks 64 of lap scarf end joints 62 are milled, machined, or otherwise formed adjacent to interior end 42 of upper member 52, middle member 54, and lower member 56 of end section 38. Cheeks 64 extend from interior end 42 substantially parallel to sides 46, 48 of each of upper member 52, middle member 54, and lower member 56 of end section 38 to shoulder 66. Shoulder 66 extends substantially perpendicular from cheek 64 and first side 46 of each of upper member 52, middle member 54, and lower member 56 of end section 38 as shown, for example in FIG. 7. Cheek 64 has a width 68, so shoulder 66 is displaced from interior end 42 by displacement 68. Shoulder 66 has a depth 70, so cheek 64 is displaced from first side 46 of end section 38 by a known displacement 70 equal to one-half of thickness 50 and is thus also displaced by displacement 71 equal to displacement 70 from second side 48 of end section 38.

Lap scarf joints 62 facilitate the joining of one end section 38 to another end section 38, as shown, for example, in FIG. 12, or to another skeletal component as is described hereinafter. Since depth 70 of shoulder 66 is one-half thickness 50 of end section 38, two end sections 38, or an end section 38 and another skeletal component, can be joined cheek 64 to cheek 64 to form a unit having a width 74 which is the same as thickness 50 of end section 38. Extending substantially perpendicular through cheek 64 and second side 48 is a connection hole 76. Connection hole 76 is preferably formed during the extrusion of end-shaped extrudate but may be drilled through end section 38 after separation from end-shaped extrudate. Center 77 of connection hole 76 is displaced from interior end 42 by a displacement 180 equal to one half width 68 of cheek 64 and is also displaced from shoulder 66 by displacement 182 equal to one-half width 68 of cheek 64.

Figure 8:
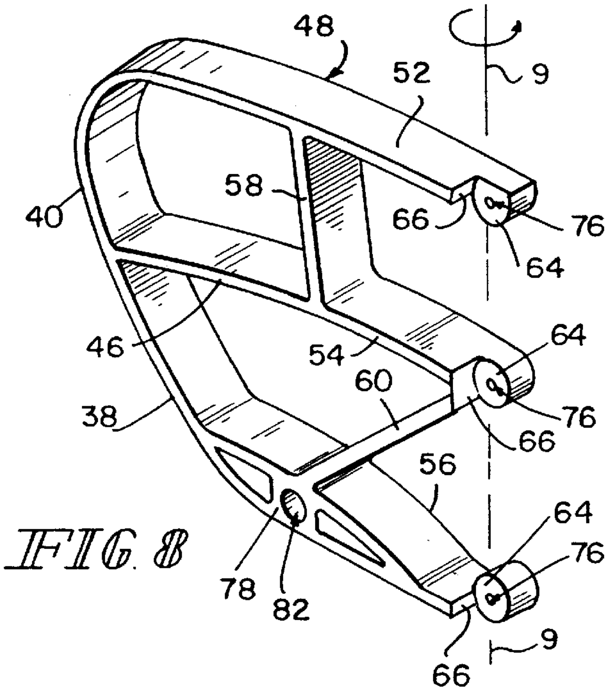
FIG. 8 is a perspective view of the end section of FIG. 6.
Figure 9:
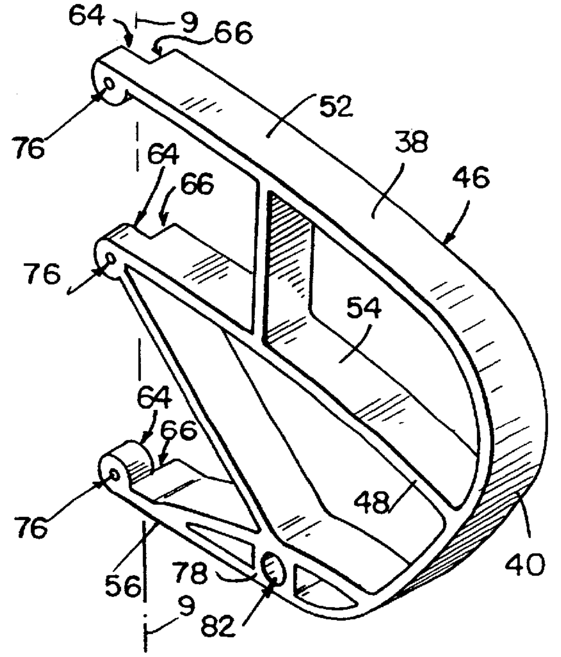
FIG. 9 is a perspective view of the end section of FIG. 8 rotated 180 degrees about axis 9—9 of FIG. 8.

Referring to FIGS. 8 and 9, when end section 38 is rotated 180 degrees about axis 9—9, cheek 64 and shoulder 66 are positioned to form a lap scarf joint 62 with cheek 64 and shoulder 66 of another non-rotated end section 38. During assembly of half length siderail skeleton 222, two substantially identical end sections 38, one rotated 180 degrees about axis 9—9 relative to the other, are joined together so that cheeks 64 and shoulders 66 on the corresponding upper members 52, middle members 54, and lower members 56 form three lap scarf joints 62 as shown in FIGS. 1 and 12. When the corresponding interior ends of each of the members 52, 54, 56 of each end section 38 abut shoulders 66 of the corresponding members 52, 54, 56 of the other end section 38, the three connection holes 76 in each end section 38 are aligned with the corresponding connection holes 76 in the other end section 38. A screw, bolt, dowel, rivet, or other fastener 72 extends through connection holes 76 of oppositely oriented end sections 38 to form half length siderail skeleton 222, as shown, for example, in FIGS. 1 and 12.

Also located on lower member 56 of end section 38 is attachment structure 78 for attaching siderail 20 to arm mechanisms 36 of a bed. As shown, for example, in FIG. 12, patient-facing shell half 30 of plastic shell 32 is formed with holes 80 therethrough so that connectors (not specifically shown but indicated by lines 85 in FIG. 12) can pass through plastic shell 32 and through attachment holes 82 formed in attachment structure 78 in skeletal structure 22 of siderail 20. In the illustrated embodiment, a fastener such as a screw, rivet, bolt, dowel or other device (not specifically shown but indicated by lines 85 in FIG. 12) is assumed to extend from central axes 84 of arm mechanisms 36 through holes 80 in plastic shell 32 and attachment holes 82 in attachment structure 78. Center 81 of attachment hole 82 is displaced from center 77 of connection hole 76 on lower member 56 of end section 38 by a distance 86. Distance 86 is one-half the displacement 88 between central axes 84 of arm mechanisms 36. Thus, when two end sections 38 are joined to each other center 81 of attachment hole 82 of each end section 38 is separated from center 81 of attachment hole 82 of the joined end section 38 by a distance 90 equal to displacement 88 between central axes 84 of arm mechanisms 36 to facilitate attachment of siderail 20 to arm mechanisms 36 with fasteners (not specifically shown).

Figure 3:
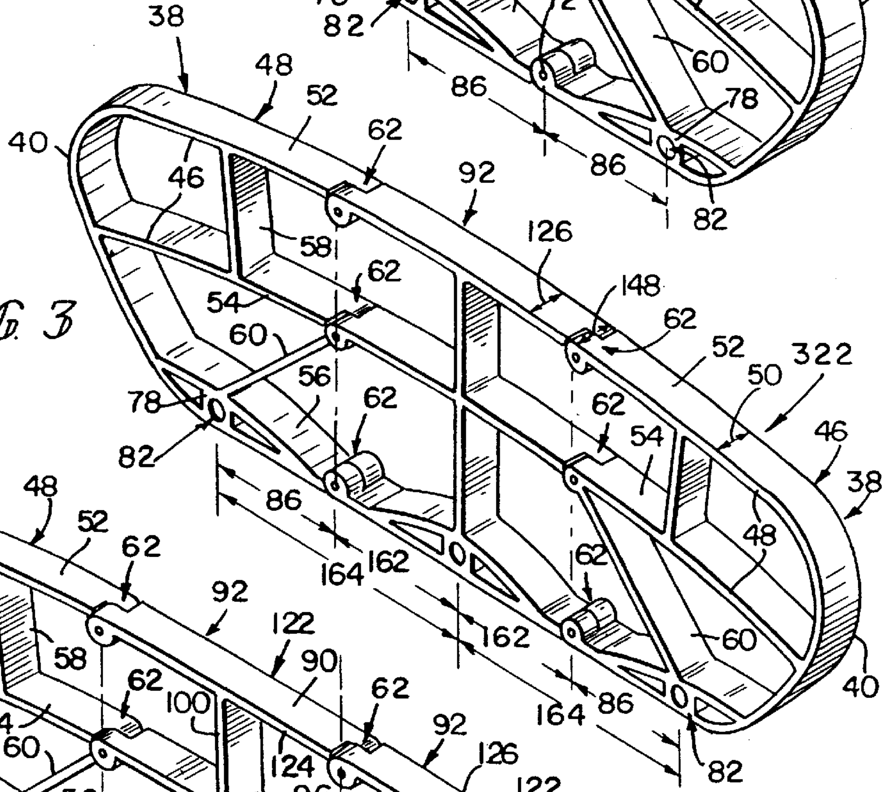
FIG. 3 is a perspective view of a three-quarters length siderail skeleton formed from two end sections identical to the end sections shown in FIG. 1 connected to a central extender section to form the three-quarters length siderail skeleton.
Figure 5:
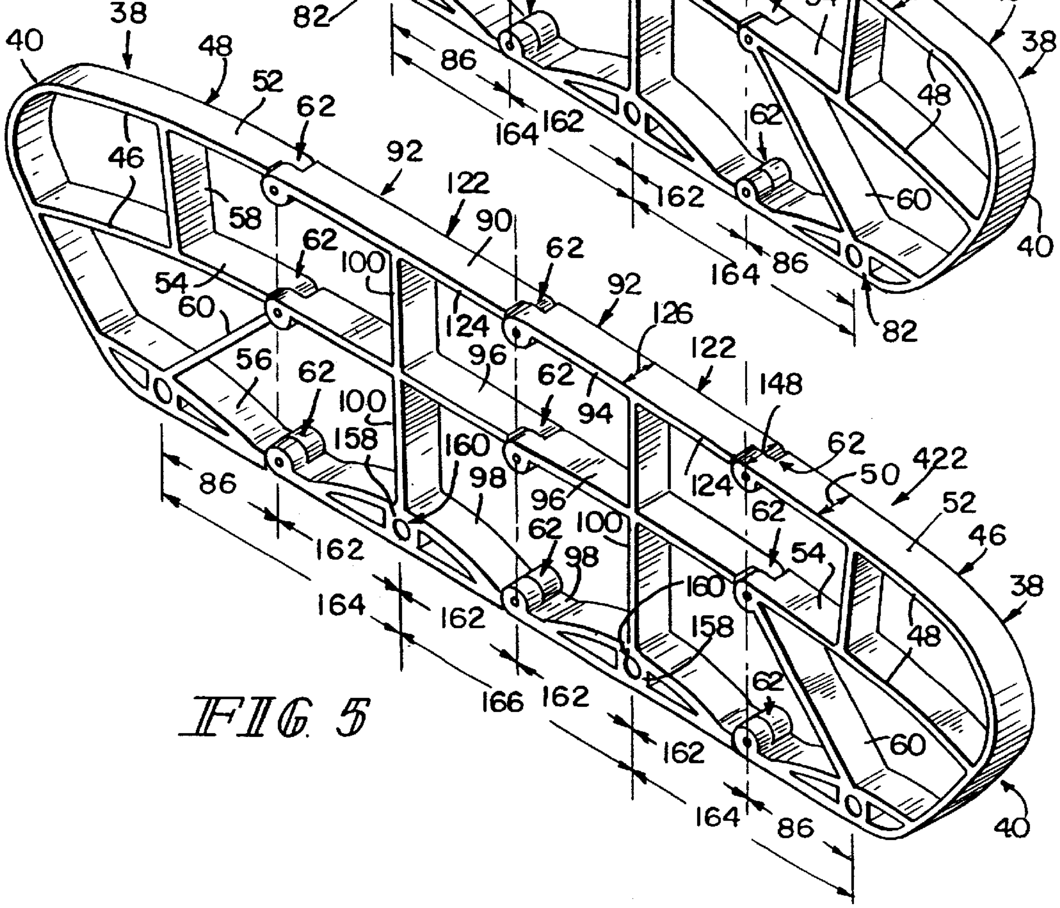
FIG. 5 is a perspective view of a full length siderail skeleton formed from two end sections identical to the end sections shown in FIG. 1 joined to two central extender sections identical to the extender section shown in FIG. 3 to form the full length siderail skeleton.
Figure 4:
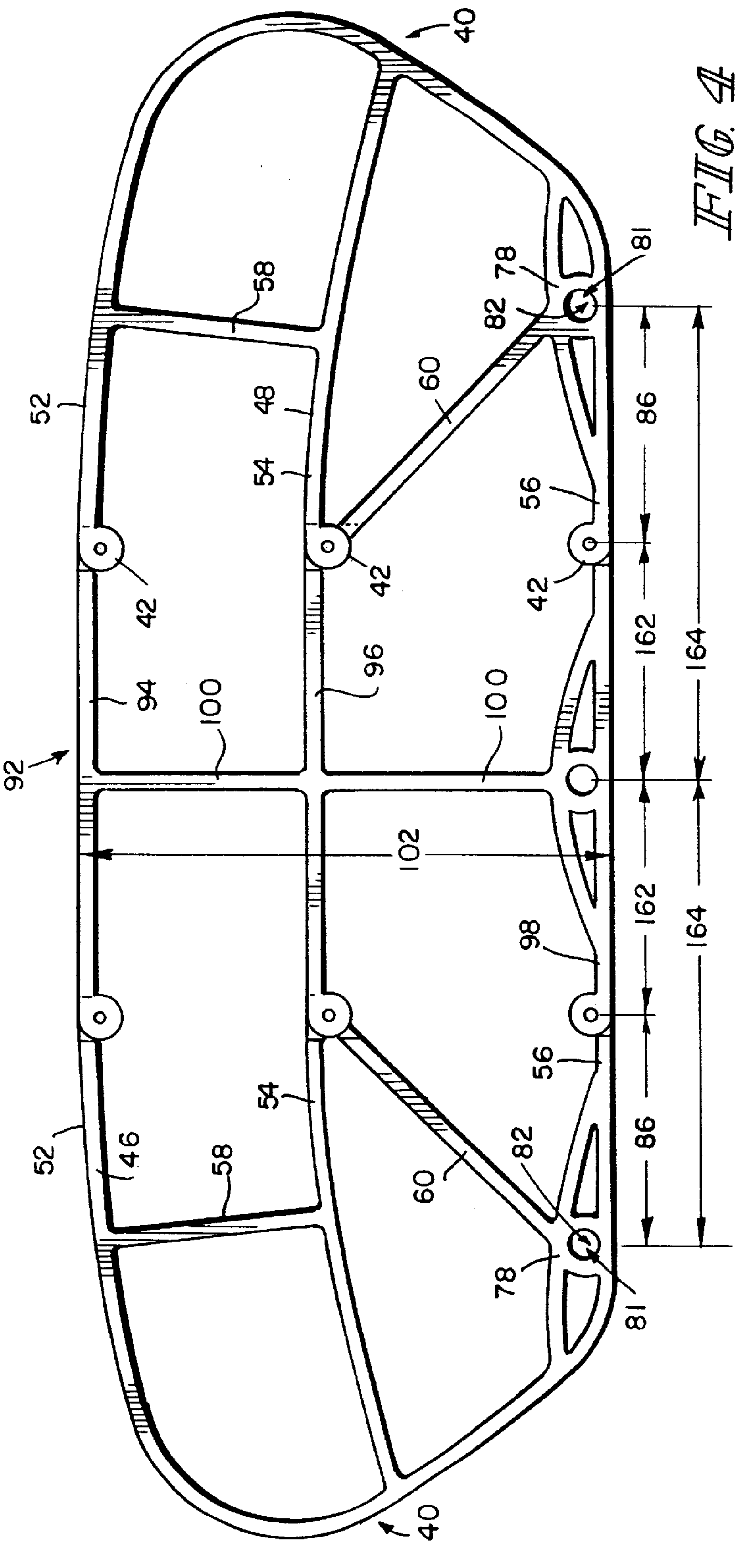
FIG. 4 is a plan view of the three-quarter length siderail skeleton of FIG. 3.
Figure 10:
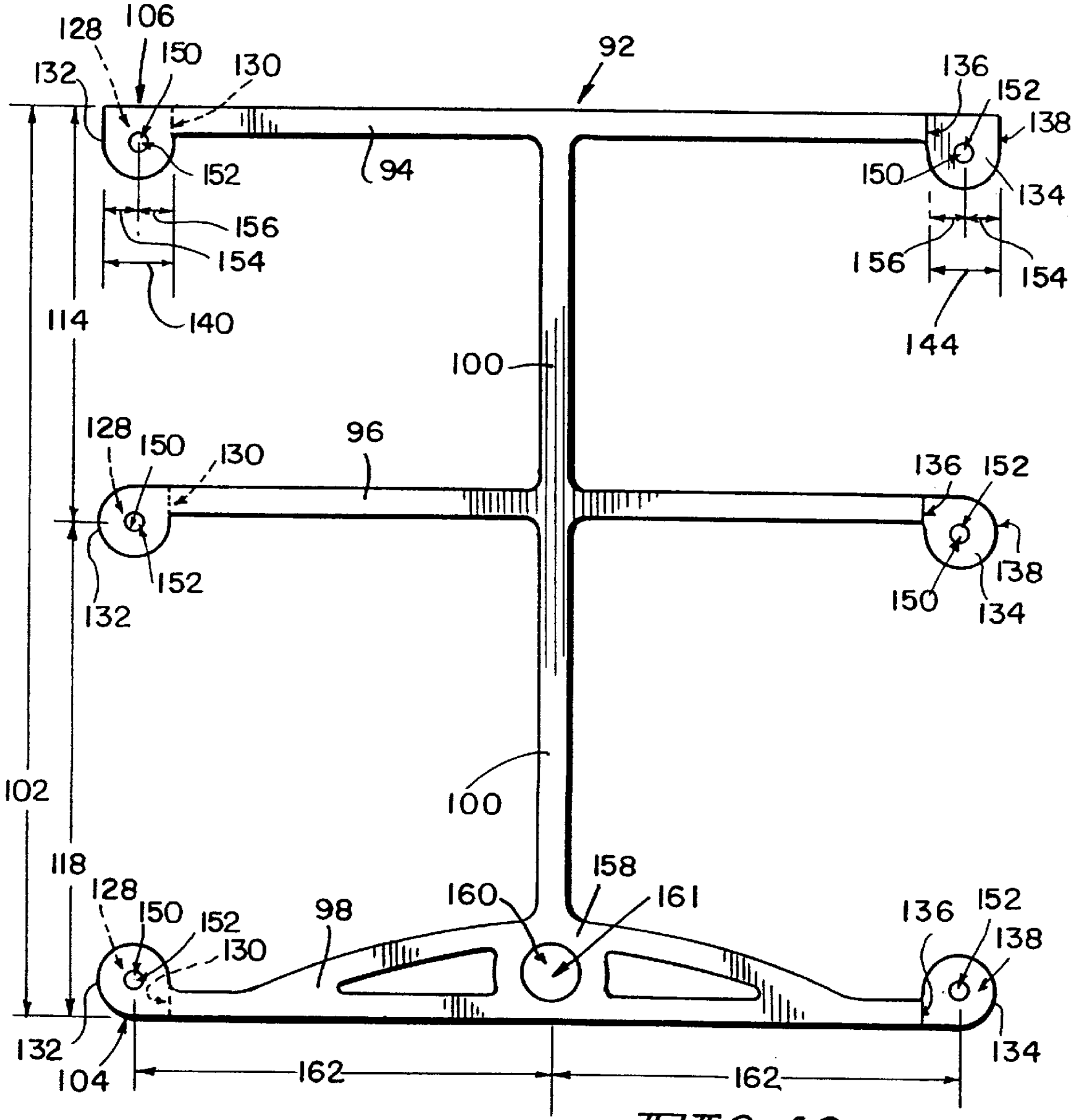
FIG. 10 is a plan view of an extender designed to be disposed between two end sections to form siderail skeletons of three-quarter or full length.
Figure 11:
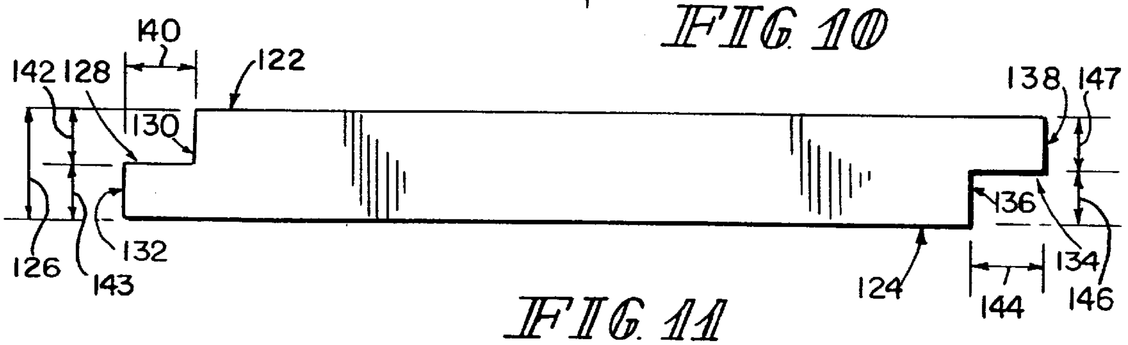
FIG. 11 is a top view of the extender of FIG. 10.

As shown in FIGS. 3, 4, 5, skeletons for siderails having lengths greater than half length siderail skeleton 222 can be formed by joining two oppositely oriented end sections 38 to one or more centrally located extender sections 92. The presently preferred embodiment of extender section 92 is illustrated in FIGS. 10 and 11. Extender section 92 has an upper arm 94, a middle arm 96, and a lower arm 98 bidirectionally extending from a strut 100 centrally connecting upper arm 94, lower arm 98, and middle arm 96. Extender section 92 has a height 102 from the bottom 104 of lower arm 98 to the top 106 of upper arm 94 which is equal to height 108 (FIG. 6) between top 110 of upper member 52 and bottom 112 of lower member 56 of end section 38 at interior end 42. Middle arm 96 is displaced from upper arm 94 by displacement 114 which is equal to displacement 116 (FIG. 6) between middle member 54 and upper member 52 of end section 38 at interior end 42. Middle arm 96 is displaced from lower arm 98 by displacement 118 which is equal to displacement 120 (FIG. 6) between middle member 54 and lower member 56 of end section 38 at interior end 42. The equivalence of height 102 and height 108, displacement 114 and 116, and displacement 118 and displacement 120 respectively facilitates the joining of end section 38 to extender section 92.

Extender section 92 is also preferably formed by extrusion of aluminum alloy. Extender section 92 is separated from extender-shaped extrudate to have a first side 122 and a second side 124 defining a thickness 126 equal to thickness 50 of end section 38. During or after separation of extender section 92 from extender-shaped extrudate, shoulders 130 and cheeks 128 are cut, milled, machined, or otherwise formed at first end 132 of each arm 94, 96, 98 of extender section 92 and shoulders 136 and cheeks 134 are cut, milled, machined, or otherwise formed at second end 138 of each arm 94, 96, 98 of extender section 92. Cheeks 128 and shoulders 130 on first end 132 of each arm 94, 96, 98 are formed by removing material from first side 122 of extender section 92 while cheeks 134 and shoulders 136 on second end 138 of each arm 94, 96, 98 are formed by removing material from second side 124 of extender section 92, as shown, for example, in FIG. 11.

Cheeks 128 extend from first end 132 substantially parallel to sides 122, 124 of each of upper arm 94, middle arm 96, and lower arm 98 of extender section 92 to shoulders 130. Shoulders 130 extend substantially perpendicular from cheeks 128 to first side 122 of each of upper arm 94, middle arm 96, and lower arm 98 of extender section 92. Cheeks 128 have a width 140, so shoulders 130 are displaced from first end 132 by displacement 140. Shoulders 130 have a depth 142, so cheeks 128 are displaced from first side 122 of extender section 92 by a known displacement 142 equal to one-half of thickness 126. Cheeks 128 are also displaced by displacement 143 equal to displacement 142 from second side 124 of extender section 92.

Similarly cheeks 134 extend from second end 138 substantially parallel to sides 122, 124 of each of upper arm 94, middle arm 96, and lower arm 98 of extender section 92 to shoulders 136. Shoulders 136 extend substantially perpendicular from cheeks 134 to second side 138 of each of upper arm 94, middle arm 96, and lower arm 98 of extender section 92. Cheeks 134 have a width 144, so shoulders 136 are displaced from second end 138 by displacement 144. Shoulders 136 have a depth 146, so cheeks 134 are displaced from second side 124 of extender section 92 by a known displacement 146 equal to one-half of thickness 126. Cheeks 134 are also displaced by displacement 147 equal to displacement 146 from first side 122 of extender section 92.

Widths 68, 140, 144 of cheeks 64, 128, 134 respectively are equal as are depths 70, 142, 146 of shoulders 66, 130, 136 to facilitate joining extender sections 92 with other extender sections 92 or end sections 38 using lap scarf joints 62. Since depth 70 of shoulder 66 is one-half thickness 50 of end section 38 and depths 142, 146 of shoulders 130, 136 are one-half thickness 126 and thickness 50 is equivalent to thickness 126, an end section 38 and another skeletal component, can be joined cheek 64 to cheek 128, 134 to form a unit having a width 148 which is the same as thickness 50 of end section 38 and thickness 126 of extender section 92. Likewise two extender sections 38 can be joined cheek 128 to cheek 134 to form a unit having a width 148 which is the same as thickness 50 of end section 38 and thickness 126 of extender section 92.

Extending substantially perpendicular through cheeks 128 and first side 122 and through cheeks 134 and second side 124 are connection holes 150. Connection holes 150 are preferably formed during the extrusion of extender-shaped extrudate but may be drilled through extender section 92 after separation from extender-shaped extrudate. Centers 152 of connection holes 150 are displaced from first and second ends 132, 138 respectively by a displacement 154 equal to one half of widths 140, 144 of cheeks 128, 134 respectively. Centers 152 of connection holes 150 are also displaced from shoulders 130, 136 respectively by displacement 156 equal to one-half of widths 140, 144 of cheeks 128, 134 respectively. Since displacements 154, 156, 180, and 182 are all equal, connection holes 150, 76 align when lap scarf joints 62 are formed during connection of extender sections 92 and end sections 38.

As a result of the configuration of end section 38 and extender section 92, extender section 92 can be connected to two oppositely facing end sections 38 or to one end section 38 and another extender section 92 to form skeletal structures of varying lengths. For example, FIG. 3 illustrates a three-quarters length siderail skeleton 322 formed from two end sections 38 with an extender section 92 disposed therebetween while FIG. 5 illustrates a full length siderail skeleton 422 formed from two end sections 38 with two extender sections 92 disposed therebetween.

Lower arm 98 also includes an attachment structure 158 to facilitate attaching a skeletal structure including at least one extender section 92 and two end sections 38 to arm mechanisms 36 of a bed. In the illustrated embodiment, attachment structure 158 is formed to include an attachment hole 160 extending substantially perpendicularly through extender section 92 between first side 122 and second side 124. Center 161 of attachment hole 160 is displaced from centers 152 of connection holes 150 by a displacement 162 which is the same as displacement 86 of attachment hole 82 of end section 38 from connection hole 76 of end section 38. Thus, when extender section 92 is connected to end section 38 the displacement 164 between center 81 of attachment hole 82 of end section 38 and center 161 of attachment hole 160 of extender section 92 is equal to the displacement 88 between central axes 84 of arm mechanisms 36. Likewise when two extender sections 92 are connected together, the displacement 166 between center 161 of attachment hole 160 in first extender section 92 and center 161 of attachment hole 160 in second extender section 92 is equal to displacement 88 between central axes 84 of arm mechanisms 36. Thus, siderails 20 made with the disclosed modular skeletal structure are appropriately adapted for attachment to arm mechanisms 36 regardless of the number of components forming, and overall length of, the siderail because attachment holes 82, 160 are always equally spaced apart with a displacement 90, 164, 166 equal to the displacement 88 between central axes 84 of arm mechanisms 36.

While in the illustrated and described embodiments, end section 38 and extender section 92 have been referred to as being formed from an aluminum alloy, it is to be understood that these components 38, 92 may be formed from other metal alloys, composite materials, thermal plastics or other materials within the scope of the invention. Likewise, while extrusion is the preferred method of forming these components 38, 92, components 38, 92 which have been molded, stamped, or otherwise formed or assembled are within the teaching of the invention.

While the illustrated embodiments of the components 38, 92 are formed to create lap scarf joints 62 when assembled, other joint configurations and connectors which minimize the number of skeletal components 38, 92 are within the teaching of the invention, such as scarf joints, splayed lap scarf joints, and other symmetrical joints and connectors. Symmetrical joints and connectors need not be included when end sections and extender sections are formed from materials such as thermal plastics or the like that are conducive to joining using butt to butt using welding, glues or adhesives.

While the invention has been described as being used with a housing which is attached thereto to form a siderail, it is within the teaching of the invention for the siderail skeleton alone to form the siderail. It is also within the teaching of the invention for the assembled siderail skeleton to be dipped in vinyl or some other molten material to form a coating on siderail skeleton and for the coated siderail skeleton to serve as siderail.

Although the invention has been described in detail with reference to a certain illustrated embodiment, variations and modifications exist within the scope and spirit of the invention as described and defined in the following claims.

What is claimed is:

1. A method for assembling a modular siderail for attachment to a bed, the method comprising forming a first end section to include a first connector joint, forming a second end section to include a second connector joint, the second end section and the second connector joint being substantially identical to the first end section and the first connector joint, and coupling the first connector joint and the second connector joint to form a skeletal structure.

2. The method of claim 1, further comprising the step of configuring the first and second connector joints to form a lap scarf joint when coupled.

3. The method of claim 1, further comprising the step of configuring the first and second connector joints to form a splayed lap scarf joint when coupled.

4. The method of claim 1, wherein the first and second end sections are formed from a composite material.

5. The method of claim 1, wherein the first and second end sections are formed from a plastic material.

6. The method of claim 1, wherein the first and second end sections are formed by a molding process.

7. A method for assembling a modular siderail for attachment to a bed, the method comprising forming a first end section to include a first connector joint, forming a second end section to include a second connector joint, the second end section being substantially identical to the first end section, wherein the first and second end sections have a substantially identical width and each of the first and second connector joints are formed to include a shoulder having a depth substantially equal to half the width, and coupling the first connector joint and the second connector joint to form a skeletal structure.

8. A method for assembling a modular siderail for attachment to a bed, the method comprising forming a first end section to include a first connector joint, forming a second end section to include a second connector joint, the second end section being substantially identical to the first end section, configuring the first and second connector joints to form a scarf joint when coupled, and coupling the first connector joint and the second connector joint to form a skeletal structure.

9. The method of claim 8, wherein the scarf joint is a lap scarf joint.

10. The method of claim 8, wherein the scarf joint is a splayed lap scarf joint.

11. A method for assembling a modular siderail for attachment to a bed, the method comprising forming a first end section to include a first connector joint, forming a second end section to include a second connector joint, the second end section being substantially identical to the first end section and wherein the first and second end sections are formed by an extrusion of a metal alloy, and coupling the first connector joint and the second connector joint to form a skeletal structure.

12. The method of claim 11, wherein the metal alloy is an aluminum alloy.

13. The method of claim 11, wherein the extrusion produces an end-shaped extrudate and further comprising the step of separating each end section from the extrudate.

14. The method of claim 13, wherein the end section is separated from the extrudate by a slicing process.

15. The method of claim 13, wherein the end section is separated from the extrudate by a cutting process.

16. A method for assembling a modular siderail for attachment to a bed, the method comprising forming a first end section to include a first connector joint, forming a second end section to include a second connector joint, the second end section being substantially identical to the first end section, and the first and second end sections being formed by a stamping process, and coupling the first connector joint and the second connector joint to form a skeletal structure.

17. A method for assembling a modular siderail for attachment to a bed, the method comprising forming a first end section to include a first connector joint, forming a second end section to include a second connector joint, the second end section being substantially identical to the first end section, coupling the first connector joint and the second connector joint to form a skeletal structure, and coating the skeletal structure to form a siderail.

18. The method of claim 17, wherein the first and second end sections are coated with a molten material.

19. The method of claim 18, wherein the molten material is vinyl.

20. The method of claim 17, wherein the first and second end sections are coated by a dipping process.

21. A method for assembling a modular siderail for attachment to a bed, the method comprising forming a first end section to include a first connector joint, forming a second end section to include a second connector joint, the second end section being substantially identical to the first end section, coupling the first connector joint and the second connector joint to form a first skeletal structure, forming a second skeletal structure to be substantially identical to the first skeletal structure, forming a first longitudinally divided shell, forming a second longitudinally divided shell to be a mirror image of the first longitudinally divided shell, attaching the first longitudinally divided shell to the first skeletal structure to form a first siderail, and attaching the second longitudinally divided shell to the second skeletal structure to form a second siderail.

22. A method of manufacturing the skeletal structure of a bed siderail comprising the steps of:

extruding an end-shaped extrudate having a first end and a second end, separating two end sections each having a first end and a second end from the extruded end-shaped extrudate, and forming connectors on the second end of the separated end sections.

23. The method of claim 22, further comprising the step of joining the connectors of the two end sections.

24. The method of claim 22, further comprising the steps of:

extruding an extender-shaped extrudate having a first end and a second end, separating an extender section having a first end and a second end from the extruded extender-shaped extrudate, and forming connectors on the first end and second end of the separated extender section.

25. The method of claim 24, further comprising the steps of:

joining the connector of one of the end sections to the connector of the first end of the extender section, and joining the connector of the other end section to the connector of the second end of the extender section.

26. The method of claim 24, further comprising the steps of:

separating a second extender section having a first end and a second end from the extruded extender-shaped extrudate, forming connectors on the first end and second end of the second extender section, joining the connector of one of the end sections to the connector on the first end of the first extender section, joining the connector of the second end of the first extender section to the connector of the first end of the second extender section, and joining the connector of the other end section to the connector of the second end of the second extender section.

27. A method for assembling a siderail for attachment to a bed having a patient support surface, a first side and a second side, the method comprising:

joining a first end section and a second end section to form a symmetrical skeletal structure, forming a first housing half section to include an outer perimeter edge, a plurality of attachment holes, a speaker grill, and a plurality of control portions, forming a second housing half section having an outer perimeter edge with a substantially identical shape as the outer perimeter edge of the first housing half section, joining the first housing half section and the second housing half section over the skeletal structure to form a siderail having an exterior shell, and joining the siderail to the first side of the bed via the attachment holes so that the speaker grill and the plurality of control portions face the patient support surface of the bed.

28. The method of claim 27, wherein the first and second end sections and the first and second housing half sections are formed to be interchangeable to enable the siderail to be joined to either the first side or the second side of the bed.

29. A method for manufacturing an end section of a siderail for a bed, the end section having an interior end and an exterior end, the method comprising:

forming a skeletal structure to include an upper member, a middle member, a lower member each having an interior end and an exterior end, an upper support extending substantially vertically between the upper member and the middle member, and a lower support extending at an angle from the interior end of the middle member to the exterior end of the lower member, each of the upper, middle and lower members being connected at the exterior end of the end section and spaced apart at the interior end of the end section, and forming an end joint adjacent to the interior end of each of the upper member, middle member and lower member of the skeletal structure.

30. The method of claim 29, wherein each end joint is formed to include a cheek and a shoulder, the cheek extending from the interior end of the end section substantially parallel to each of the upper, middle and lower members to the shoulder, the shoulder extending substantially perpendicularly from the cheek of the upper member, middle member, and lower member.

31. The method of claim 30, further comprising the step of forming a connection hole in each cheek.

32. The method of claim 31, wherein each connection hole is formed during an extrusion process.

33. The method of claim 31, wherein each connection hole is formed by a drilling process.

34. The method of claim 1, further comprising:

forming an extender having a first end and a second end, forming first and second connectors on the first and second ends of the extender, respectively, the first connector being configured to mate with the first connector joint of the first end section, and the second connector being configured to mate with the second connector joint of the second end section to form the skeletal structure.

35. The method of claim 34, further comprising the steps of:

forming a second extender substantially identical to the extender, and configuring the connectors of the first and second extenders to mate with one another and with the first and second connector joints of the first and second end sections to facilitate formation of varying length skeletal structures.

* * * * *